United States Patent
Huprikar

(10) Patent No.: US 7,219,883 B2
(45) Date of Patent: May 22, 2007

(54) ISOLATION ASSEMBLY FOR A VEHICLE SUSPENSION COMPONENT

(75) Inventor: Anand Huprikar, Novi, MI (US)

(73) Assignee: BASF Corporation, Florham Park, NJ (US)

( * ) Notice: Subject to any disclaimer, the term of this patent is extended or adjusted under 35 U.S.C. 154(b) by 424 days.

(21) Appl. No.: 10/744,521

(22) Filed: Dec. 23, 2003

(65) Prior Publication Data
US 2005/0134016 A1    Jun. 23, 2005

(51) Int. Cl.
    *B60G 11/22*    (2006.01)
(52) U.S. Cl. ............... 267/293; 267/141.4; 267/270; 384/222
(58) Field of Classification Search ........ 267/292–294, 267/141.2, 141.3, 141.4, 141.7, 279, 280, 267/281, 270; 384/220, 222, 296, 297; 403/224–226
    See application file for complete search history.

(56) References Cited

U.S. PATENT DOCUMENTS

| | | | | |
|---|---|---|---|---|
| 2,675,283 A | | 11/1949 | Thomson | |
| 5,437,439 A | * | 8/1995 | Brokamp et al. | ........... 267/293 |
| 5,820,115 A | * | 10/1998 | Stevenson et al. | .......... 267/293 |
| 6,241,225 B1 | * | 6/2001 | Krause | ........................ 267/292 |
| 6,513,801 B1 | * | 2/2003 | McCarthy | .................... 267/293 |
| 6,619,639 B1 | | 9/2003 | Shelley et al. | |
| 2002/0141669 A1 | | 10/2002 | Testroet | |

FOREIGN PATENT DOCUMENTS

| | | | |
|---|---|---|---|
| DE | 4415599 A1 | * | 8/1995 |
| FR | 2657564 A1 | * | 8/1991 |
| FR | 2768661 A1 | | 3/1999 |

* cited by examiner

*Primary Examiner*—Pam Rodriguez
(74) *Attorney, Agent, or Firm*—Fernando A. Borrego

(57) ABSTRACT

An isolation assembly for use with a vehicle. The isolation assembly includes a collar having a continuous wall. A carriage is disposed within a cavity of the wall and is displaceable relative to the collar. A fastener supports the carriage relative to a frame portion of the vehicle. An insulator is disposed between the carriage and the wall of the collar for coupling the carriage to the collar and for isolating the carriage and the fastener from the collar. The insulator has a first portion and a plurality of second portions. The first portion encapsulates one of the second end surface and the peripheral surface of the carriage. The second portions are movable relative to the first portion about a living hinge to encapsulate the other of the peripheral surface and second end surface of the carriage such that the carriage is adequately isolated from the collar.

46 Claims, 4 Drawing Sheets

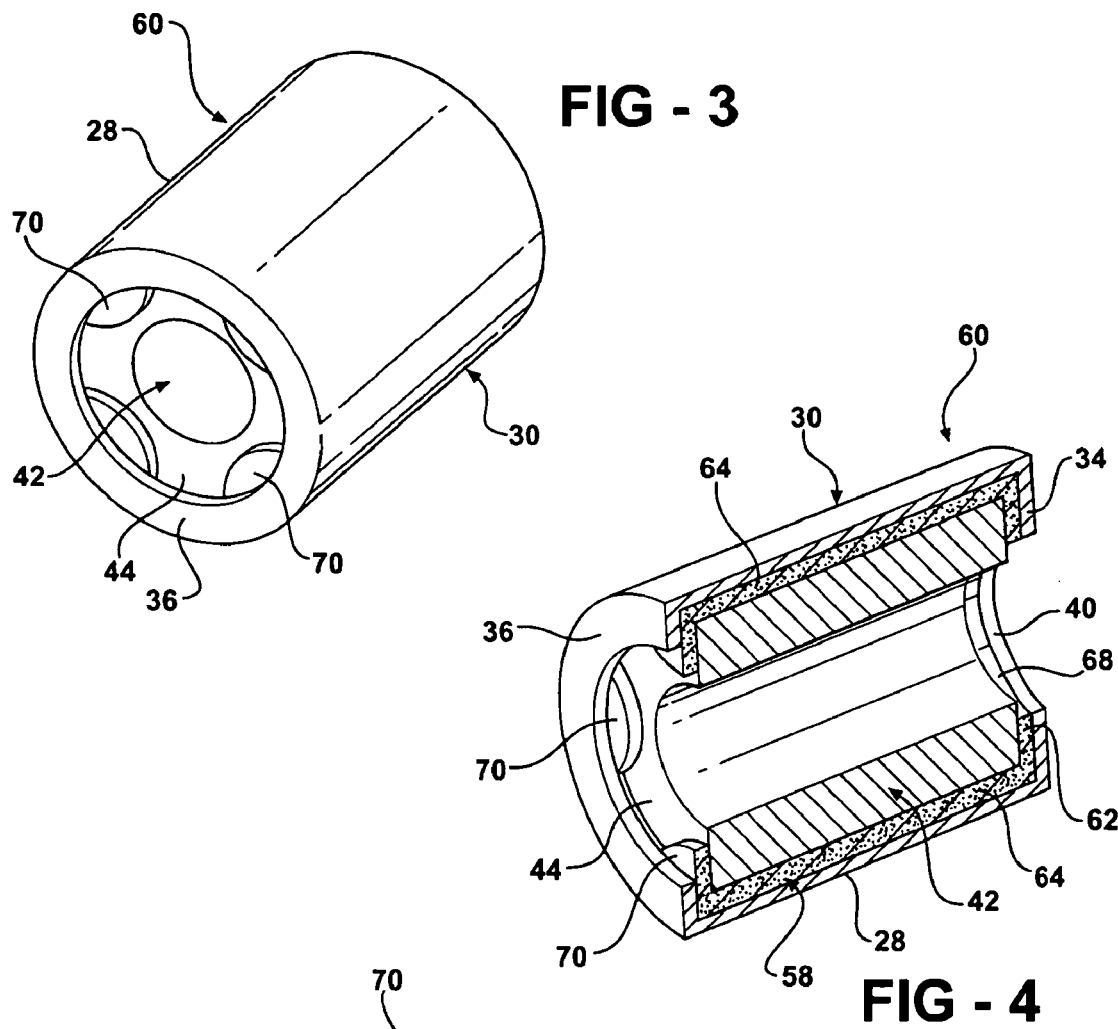
FIG - 3
FIG - 4
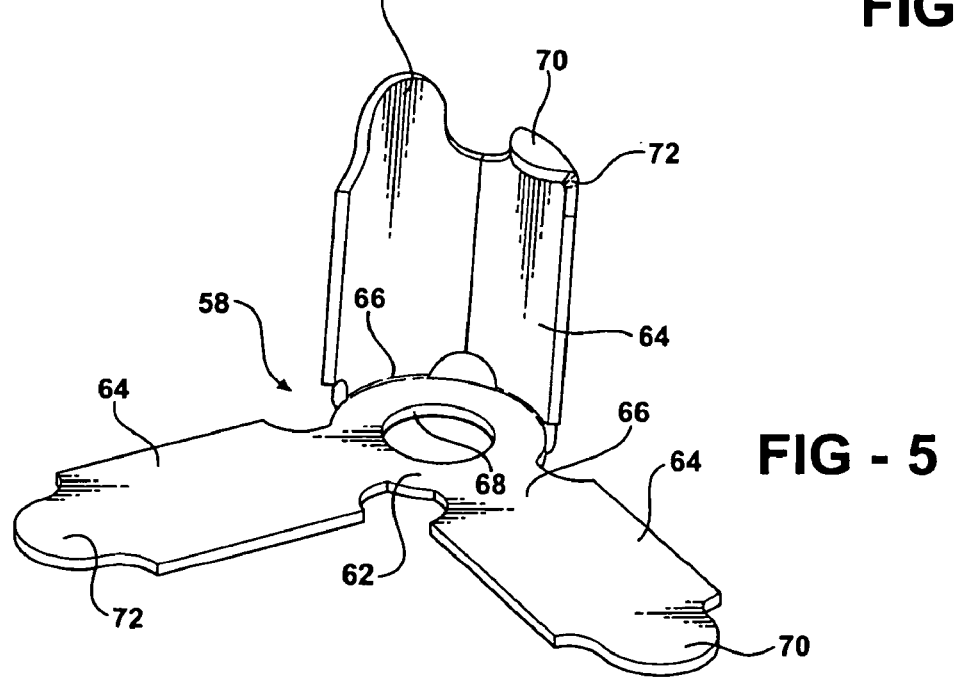
FIG - 5

ISOLATION ASSEMBLY FOR A VEHICLE SUSPENSION COMPONENT

BACKGROUND OF THE INVENTION

1. Field of the Invention

The subject invention relates to a isolation assembly and bushings for a vehicle having an insulator for isolating vibrational movement between a frame portion and a vehicle body, and controlling the total movement at the same time.

2. Description of Related Art

Isolation assemblies for vehicles are well known in the art. Typically, the isolation assemblies include a collar mounted to a frame portion and an insulator for isolating movements of the frame portion from a vehicle body. The insulators are typically formed of an elastomeric material such as rubber or micro-cellular polyurethane (MPU). Many of the insulators are designed to isolate vibrational movement in only one direction, such as vertical movement or lateral movement. The prior art therefore uses multiple insulators in conjunction with each other to isolate multiple movements. It would be desirable to simplify the insulators and form the insulators of a single unitary component that could isolate multiple movements. Further, it would be desirable to form such a unitary insulator of a MPU material. As is known in the art, forming three-dimensional components made of MPU material has been found to be a difficult and expensive task.

SUMMARY OF THE INVENTION AND ADVANTAGES

The subject invention defines an isolation assembly for use with a vehicle having a frame portion. The isolation assembly comprises a collar having a substantially continuous wall defining a cavity. The collar is adapted to be supported relative to the frame portion of the vehicle. A carriage has first and second end surfaces and a peripheral surface. The carriage is at least partially disposed within the cavity. A fastener has first and second ends and is adapted to support the carriage relative to the frame portion. An insulator is disposed between the carriage and the wall of the collar for coupling the carriage to the collar and for isolating the carriage and the fastener from the collar. The insulator has a first portion and a plurality of second portions. The first portion at least partially encapsulates one of the second end surface and the peripheral surface of the carriage. The second portions are movable relative to the first portion about a living hinge to at least partially encapsulate the other of the peripheral surface and second end surface of the carriage such that the carriage is adequately isolated from the collar.

The subject invention also includes a method of installing the insulator within the isolation assembly. The method comprises the steps of positioning the insulator about the carriage. The carriage and insulator are then at least partially inserted within the cavity to couple the carriage to the collar through the insulator such that the carriage is isolated from the collar. The fastener is inserted through the carriage. The fastener is now secured such that the carriage remains inserted within the cavity. The step of positioning the insulator about the carriage is further defined as at least partially encapsulating one of the second end surface and the peripheral surface of the carriage with the first portion, moving the second portions relative to the first portions about the living hinges, and at least partially encapsulating the other of the peripheral surface and second end surface of the carriage with the second portions to adequately isolate the carriage from the collar.

The subject invention therefore provides an insulator that can isolate vibrational movements in vertical, lateral, or radial directions and can be formed of a micro-cellular polyurethane material.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is an assembled perspective view of the isolation sub-assembly of FIGS. 1A and 1B;

FIG. 4 is a cross-sectional view of the isolation sub-assembly of FIG. 3;

FIG. 5 is a perspective view of an insulator;

DETAILED DESCRIPTION OF THE INVENTION

Figure 1A:
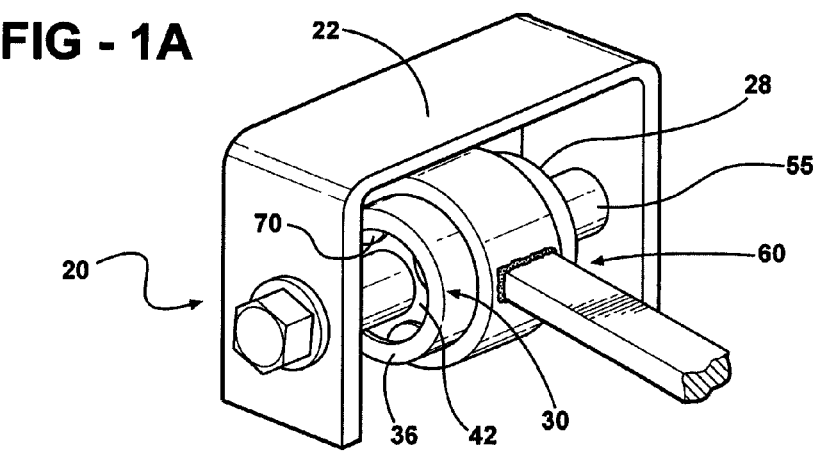
FIG. 1A is a perspective view of an isolation assembly in accordance with the subject invention.
Figure 1B:
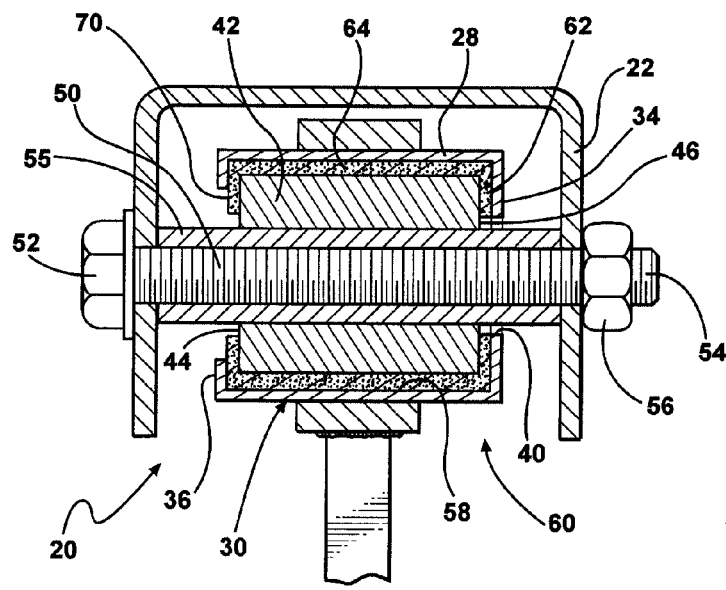
FIG. 1B is a cross-sectional view of the isolation assembly of FIG. 1A.

Referring to the Figures, wherein like numerals indicate like or corresponding parts throughout the several views, an isolation assembly in accordance with one embodiment of the subject invention is generally shown at 20 in FIGS. 1A and 1B. The isolation assembly 20 is shown in a rest state in these Figures. Although not required, the isolation assembly 20 is preferably for use with a vehicle having a frame portion 22. For illustrative purposes, only a small U-shaped fragment of the frame portion 22 is shown in FIG. 1. The frame portion 22 can be of any suitable design or configuration without deviating from the scope of the subject invention. In addition, it should be appreciated by those skilled in the art that the subject invention may be incorporated into different apparatuses and the subsequent discussion relating to a vehicle is but one contemplated environment for the invention.

The isolation assembly 20 includes a collar 30 having a substantially continuous wall 28 defining a cavity. The collar 30 has a first flange 34 and a second flange 36, the purpose of which will be discussed in greater detail below. The collar 30, wall 28, and flanges 34, 36 may be formed of a single continuous piece of material, such as metal, or may be formed of separate components and welded together. The collar 30 also includes an aperture 40 with the continuous wall 28 surrounding the aperture 40. Preferably the aperture 40 is annular and the continuous wall 28 surrounding the aperture 40 is likewise annular.

A carriage 42, having first 44 and second 46 end surfaces and a peripheral surface 48, is at least partially disposed within the cavity defined by the continuous wall 28. Preferably, the carriage 42 is substantially tubular with an outer surface that is complementary in configuration to the annular wall 28.

A fastener 50 has first 52 and second 54 ends with the fastener 50 adapted to support the carriage 42 relative to the frame portion 22. Preferably, the fastener 50 is a bolt 50 with the first end 52 mounted to one end of the frame portion 22 and the second end 54 mounted to another end of the frame portion 22 by a nut 56. As illustrated, the fastener 50 at least partially extends through the carriage 42 and the aperture 40 in the collar 30 and the first flange 34. Preferably, a sleeve 55 is provided between the fastener 50 and the carriage 42. The fastener 50 and sleeve 55 are tightened onto the frame portion 22 in such a manner so that the fastener 50 and sleeve 55 do not move during any movement of the collar 30. Further, the carriage 42 is preferably mounted onto the sleeve 55 in such a manner as to limit the amount of movement of the carriage 42 relative to the sleeve 55.

Figure 2:
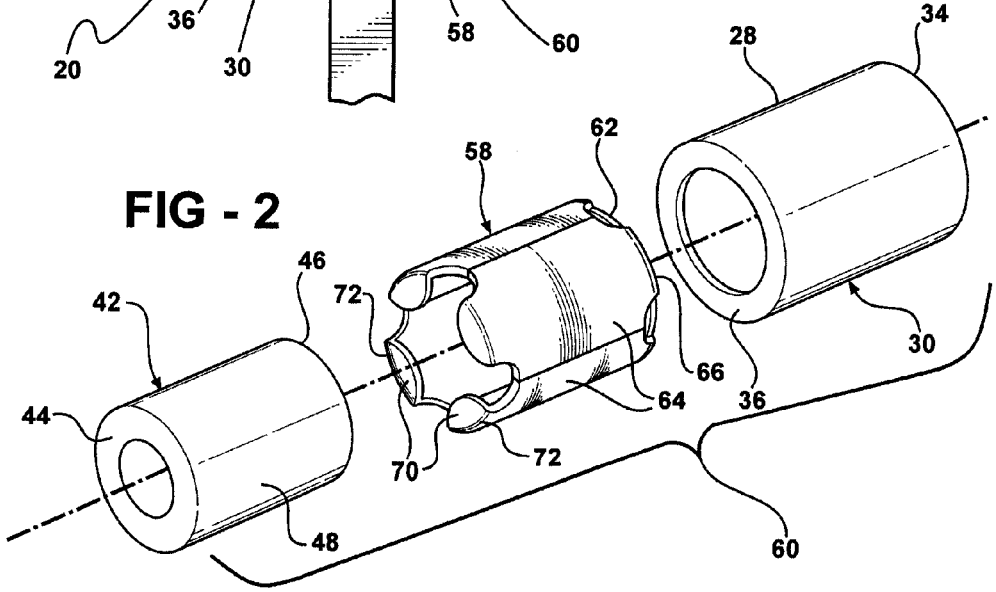
FIG. 2 is an exploded perspective view of an isolation sub-assembly used in FIGS. 1A and 1B.
Figure 6:
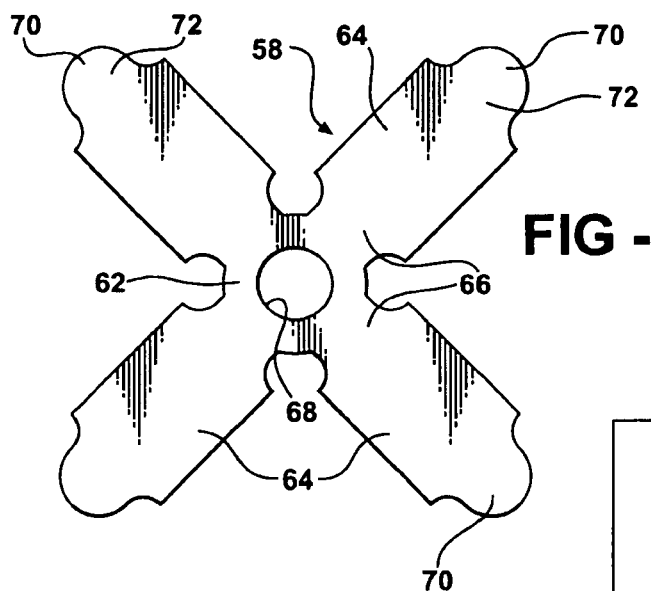
FIG. 6 is a top planar view of the insulator of FIG. 5.

An insulator 58 is disposed between the carriage 42 and the wall 28 of the collar 30 for coupling the carriage 42 to the collar 30 and for isolating the carriage 42 and the fastener 50 from the collar 30. The insulator 58 in turn isolates the collar 30 from the frame portion 22. As also shown in FIGS. 2-4, the combination of the carriage 42, insulator 58, and collar 30 define an isolation sub-assembly 60. The isolation sub-assembly 60 can be manufactured as a separate unit and subsequently secured to the isolation assembly 20 by the bolt 50.

In the contemplated embodiment shown in FIGS. 2-6, the first portion 62 of the insulator 58 at least partially encapsulates the second end surface 46 of the carriage 42. The first portion 62 is complementary in configuration with the tubular carriage 42 such that in this embodiment the first portion 62 is circular, see FIGS. 5 and 6. Further, the substantially annular wall 28 and substantially tubular carriage 42 define a substantially tubular insulator 58 that isolates the carriage 42 from the collar 30 equally in all directions. The first portion 62 also includes an aperture 68 that aligns with the aperture 40 in the collar 30 and the first flange 34. The first portion 62 of the insulator 58 is specifically disposed between the second end surface 46 of the carriage 42 and the first flange 34 to isolate the carriage 42 from the first flange 34.

The second portions 64 encapsulate the peripheral surface 48 of the carriage 42. Each of the second portions 64 are substantially the same length and extend the same distance from the first portion 62 such that the peripheral surface 48 of the carriage 42 is equally encapsulated. Preferably, each of the second portions 64 are also substantially the same width. Even more preferably, the insulator 58 includes four substantially rectangular second portions 64 extending from the first portion 62 with the second portions 64 being positioned equidistantly around the first portion 62 to fully encapsulate the peripheral surface 48 of the carriage 42. Each of the second portions 64 can be identical. The insulator 58 also includes a plurality of neck portions defining the living hinges 66 with the neck portions being narrower than the first 62 and second 64 portions.

In this embodiment, the insulator 58 also includes a plurality of third portions 70 that are movable relative to the first 62 and second 64 portions about a second living hinge 72. The third portions 70 at least partially encapsulate the first end surface 44 of the carriage 42 such that the third portions 70 are disposed between the first end surface 44 of the carriage 42 and the second flange 36 to isolate the carriage 42 from the second flange 36. Preferably, one of the third portions 70 extends from each of the second portions 64. As illustrated, the third portions 70 are formed as semi-circular tabs.

Preferably, the first 62, second 64, and third 70 portions of the insulator 58 are formed of a common homogeneous material. More preferably, the common homogeneous material is further defined as micro-cellular polyurethane. As discussed in the background section, micro-cellular polyurethane is difficult and expensive to manufacture into three-dimensional shapes. As such, the insulator 58 of the subject invention includes the first 62, second 64, and third 70 portions that can be manufactured as a planar component and then manipulated into a three-dimensional shape.

Figure 7:
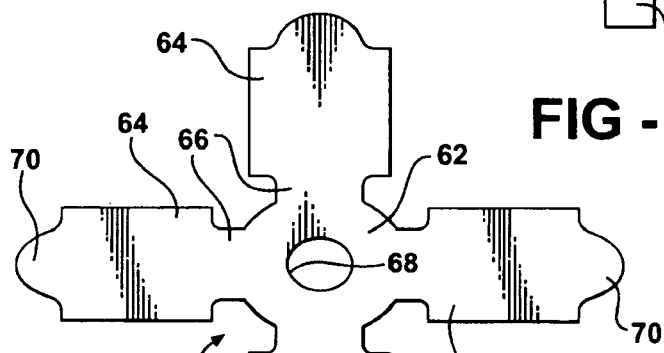
FIG. 7 is a top planar view of an alternative insulator.

FIG. 7 illustrates an alternative embodiment of the insulator 58 that includes an oval first portion 62. The remaining aspects of this alternative insulator 58 are substantially the same as the embodiment of FIGS. 2-6. In particular, this alternative insulator 58 also includes four second portions 64, similar neck portions defining living hinges 66, and a third portion 70 extending from each of the second portions 64.

Figure 8:
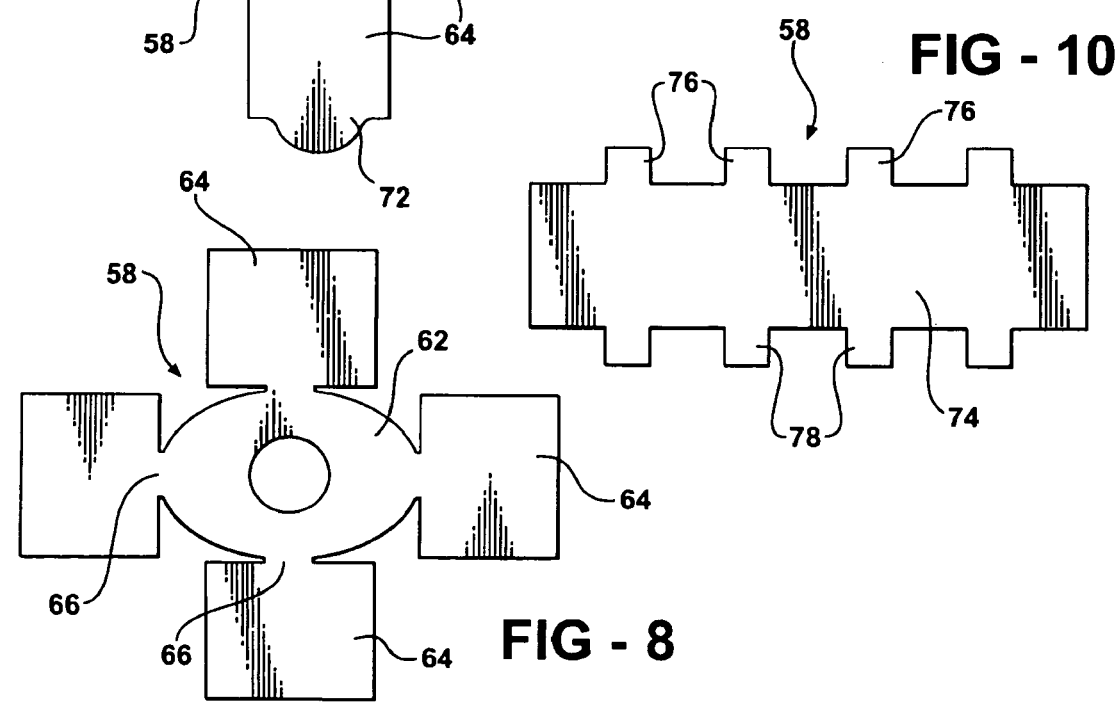
FIG. 8 is a top planar view of another alternative insulator.

FIG. 8 illustrates another alternative embodiment of the insulator 58 that includes an oval first portion 62 with slightly different configurations for the neck portions/living hinges 66 and second portions 64. Further, the third portions 70 are removed.

Figure 9:
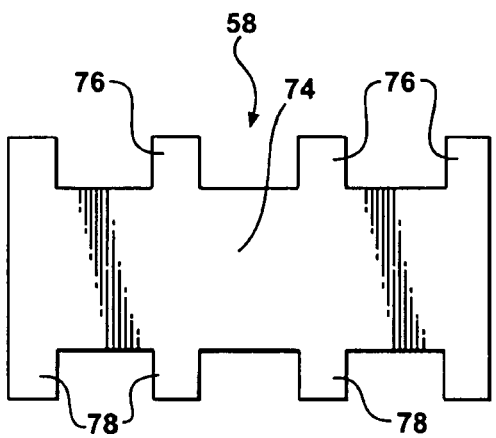
FIG. 9 is a top planar view of yet another alternative insulator.
Figure 10:
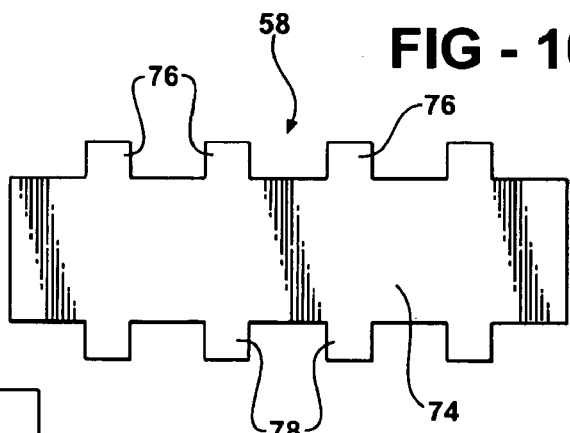
FIG. 10 is a top planar view of another alternative insulator.

Turning to the embodiments of FIGS. 9 and 10, the insulator 58 is of a significantly different configuration. In particular, these insulators 58 include a first portion 74 encapsulating the peripheral surface 48 of the carriage 42. Preferably, the first portion 74 is substantially rectangular and wraps around the peripheral surface 48 of the carriage 42. The insulator 58 also includes second portions 76 that at least partially encapsulate the second end surface 46 of the carriage 42. Each of the second portions 76 are substantially the same size and are equidistantly spaced along the rectangular first portion 72. Preferably, each of the second portions 76 are substantially the same length and extend the same distance from the first portion 72. Further, each of the second portions 76 are substantially the same width such that each of the second portions 76 are preferably identical. The second portions 76 of the insulator 58 are designed to be disposed between the second end surface 46 of the carriage 42 and the first flange 34 of the collar 30 to isolate the carriage 42 from the first flange 34.

The insulators 58 of the embodiments shown in FIGS. 9 and 10 also include a plurality of third portions 78 that are movable relative to the first 74 and second 76 portions about a second living hinge. These third portions 78 at least partially encapsulate the first end surface 44 of the carriage 42 such that the third portions 78 are disposed between the first end surface 44 of the carriage 42 and the second flange 36 of the collar 30 to isolate the carriage 42 from the second flange 36. The third portions 78 each extend from the first portion 74 in an opposite direction from the second portions 76. As with the second portions 76, each of the third portions 78 are substantially the same size and are equidistantly spaced along the rectangular first portion 74. Each of the third portions 78 are also substantially the same length and extend the same distance from the first portion 74. Further, each of the third portions 78 are substantially the same width such that each of the third portions 78 are preferably identical.

As shown in FIG. 9, the rectangular first portion 74 ends at the outer most second 76 and third portions 78. Alternatively, as shown in FIG. 10, the rectangular first portion 74 extends beyond the second 76 and third portions 78.

Figure 11:
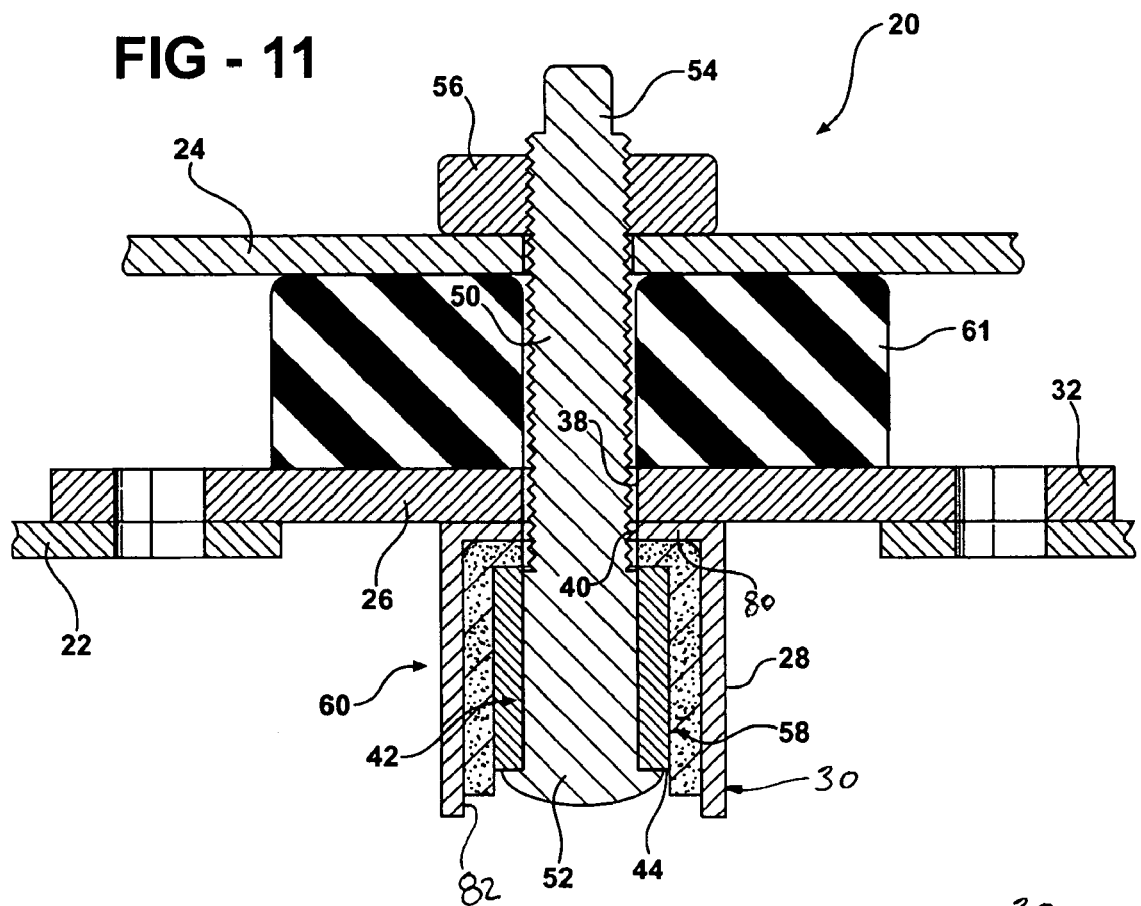
FIG. 11 is cross-sectional view of an alternative isolation assembly.
Figure 12:
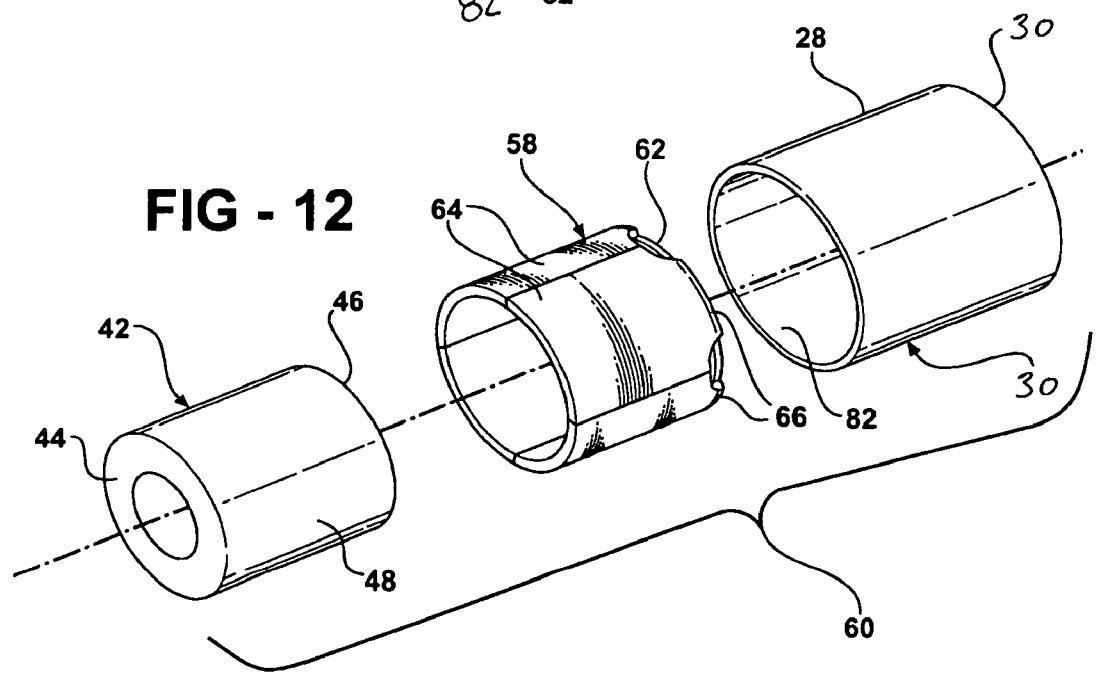
FIG. 12 is an exploded perspective view of an isolation sub-assembly used in FIG. 11.

Turning to the embodiment of FIGS. 11 and 12, the isolation assembly 20 shown in these Figures is known as a body mount. In this embodiment, a support plate 26 is provided with the isolation sub-assembly 60 abutting the support plate 26. The support plate 26 has a pair of appendages 32 that provide a mounting point such that the support plate 26 and isolation sub-assembly 60 can be mounted to the frame portion 22 of the vehicle. The plate 26, isolation sub-assembly 60, and frame portion 22 therefore move as a single unit.

This embodiment further includes a bushing 61 that is included to isolate the frame portion 22 from a vehicle body 24. The bushing 61 illustrated is formed of a rubber material and has a donut-like configuration. Bushings of this type and configuration are well known in the art and will not be discussed in any greater detail.

The isolation assembly 20 of FIGS. 11 and 12 has some common features to the isolation assembly 20 of FIG. 1. The primary difference is in the configuration of the collar 30 and insulator 58. Specifically, the collar 30 is further defined as an open cup having a continuous wall 28 extending between a top flange 80 and an open bottom 82. The top flange 80 includes the aperture 40 aligned with an aperture 38 of the support plate 26. Preferably the apertures 38, 40 are annular and the continuous wall 28 surrounding the apertures 38, 40 is likewise annular.

This embodiment also includes a similar carriage 42, having first 44 and second 46 end surfaces and a peripheral surface 48, that is at least partially disposed within the cavity defined by the continuous wall 28. The carriage 42 is displaceable relative to the collar 30 along a vertical line of travel and is also displaceable relative to the collar 30 along a lateral line of travel. A fastener 50 has first 52 and second 54 ends with the first end 52 of the fastener 50 abutting the first end surface 44 of the carriage 42. The second end 54 of the fastener 50 is mounted to the vehicle body 24 by a nut 56.

The insulator 58 of this embodiment has an alternative configuration, such as the one shown in FIG. 8, in which the third portions are removed. The open collar 30 does not have a second flange such that it is not necessary to have a third portion. The insulator 58 may extend beyond the first end surface 44 of the carriage 42 as shown. Preferably the insulator 58 will not extend beyond the open bottom 82, i.e., the length of the open collar 30. As with the embodiment of FIG. 1, the insulator 58 is disposed between the carriage 42 and the wall 28 of the collar 30 for coupling the carriage 42 to the collar 30 and for isolating the carriage 42 and the fastener 50 from the collar 30. As with the previous embodiment, the combination of the carriage 42, insulator 58, and collar 30 define an isolation sub-assembly 60. The isolation sub-assembly 60 can be manufactured as a separate unit and subsequently secured to the isolation assembly 20 by the bolt 50.

The insulator 58 shown in FIGS. 11 and 12 also has a first portion 62 and a plurality of second portions 64. Broadly stated, the first portion 62 at least partially encapsulates one of the second end surface 46 and the peripheral surface 48 of the carriage 42. The second portions 64 are movable relative to the first portion 62 about a living hinge 66 to at least partially encapsulate the other of the peripheral surface 48 and second end surface 46 of the carriage 42.

The specific insulator 58 shown in FIGS. 11 and 12 has the first portion 62 of the insulator 58 at least partially encapsulating the second end surface 46 of the carriage 42. Also, the second portions 64 encapsulate the peripheral surface 48 of the carriage 42. Each of the second portions 64 are substantially the same length and extend the same distance from the first portion 62 such that the peripheral surface 48 of the carriage 42 is equally encapsulated. Preferably, each of the second portions 64 are also substantially the same width. Even more preferably, the insulator 58 includes four substantially rectangular second portions 64 extending from the first portion 62 with the second portions 64 being positioned equidistantly around the first portion 62 to fully encapsulate the peripheral surface 48 of the carriage 42. Each of the second portions 64 can be identical.

Preferably, the first 62 and second 64 portions of the insulator 58 are formed of a common homogeneous material. More preferably, the common homogeneous material is further defined as micro-cellular polyurethane.

The insulator 58 of this embodiment could also be the type disclosed in FIGS. 9 and 10. Specifically, the first portion 74 of the insulator 58 could encapsulate the peripheral surface 48 of the carriage 42. In other words, the first portion 74 could be substantially rectangular and could wrap around the peripheral surface 48 of the carriage 42. The second portions 76 would at least partially encapsulate the second end surface 46 of the carriage 42. Each of the second portions 76 are preferably of substantially the same size and are equidistantly spaced along the rectangular first portion 74. Preferably, each of the second portions 76 are substantially the same length and extend the same distance from the first portion 74. Further, each of the second portions 76 are substantially the same width such that each of the second portions 76 are preferably identical. The second portions 76 of the insulator 58 are designed to be disposed between the second end surface 46 of the carriage 42 and the first flange 34 to isolate the carriage 42 from the first flange 34. The third portions shown in FIGS. 9 and 10 would be eliminated if this type of insulator 58 was incorporated into the isolation sub-assembly 60 of FIGS. 11 and 12.

Each of the unique insulators 58 disclosed above are preferably installed into the isolation assembly 20 in a unique manner. In particular, the subject invention includes a method of installing the insulator 58 within the isolation assembly 20. The method comprises the steps of positioning the insulator 58 about the carriage 42. The carriage 42 and insulator 58 are at least partially inserted within the cavity to couple the carriage 42 to the collar 30 through the insulator 58 such that the carriage 42 is isolated from the collar 30. The fastener 50 is inserted through the carriage 42. In the embodiment of FIGS. 11 and 12, the first end 52 of the fastener 50 abuts with the first end surface 44 of the carriage 42. The fastener 50 is then secured such that the carriage 42 remains inserted within the cavity. In the embodiment of FIGS. 1-6, the fastener 50 is secured between opposing ends of the frame portion 22. In the embodiment of FIGS. 11 and 12, the second end 54 of the fastener 50 is secured to the vehicle body 24 by the nut 56. The fastener 50 preferably passes through the carriage 42, the aperture 68 in the insulator 58, and the aperture 40 in the collar 30 to extend outwardly for interengagement with the nut 56.

In accordance with the subject invention, the step of positioning the insulator 58 about the carriage 42 is further defined as at least partially encapsulating one of the second end surface 46 and the peripheral surface 48 of the carriage 42 with the first portion 62, 74, moving the second portions 64, 76 relative to the first portions 62, 74 about the living hinges 66, and at least partially encapsulating the other of the peripheral surface 48 and second end surface 46 of the carriage 42 with the second portions 64, 76 to adequately isolate the carriage 42 from the collar 30. Preferably, the step of positioning the insulator 58 about the carriage 42 is performed before the step of inserting the carriage 42 and insulator 58 within the cavity. This order of steps simplifies the assembly procedure.

As shown in FIGS. 1A-5, 11, and 12, the step of positioning the insulator 58 about the carriage 42 is further defined as at least partially encapsulating the second end surface 46 of the carriage 42 with the first portion 62, moving the second portions 64 relative to the first portions 62 about the living hinges 66, and encapsulating the peripheral surface 48 of the carriage 42 with the second portions 64 to adequately isolate the carriage 42 from the collar 30. As shown in FIGS. 1A-5, the step of positioning the insulator 58 about the carriage 42 can be further defined as at least partially encapsulating the first end surface 44 of the carriage 42 with the third portions 70.

Alternatively, the step of positioning the insulator 58 about the carriage 42 could be defined as encapsulating the peripheral surface 48 of the carriage 42 with the first portion 74, moving the second portions 76 relative to the first portions 74 about the living hinges, and at least partially encapsulating the second end surface 46 of the carriage 42 with the second portions 76 to adequately isolate the carriage 42 from the collar 30. The step of positioning the insulator 58 about the carriage 42 is even further defined as at least partially encapsulating the first end surface 44 of the carriage 42 with the third portions 78. This alternative method requires a slightly different installation procedure. In particular, the step of positioning the insulator 58 about the carriage 42 is further defined as wrapping the peripheral surface 48 of the carriage 42 with the first portion 74.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. An isolation assembly for use with a vehicle having a frame portion, said isolation assembly comprising:
   a collar having a substantially continuous wall defining a cavity with said collar adapted to be supported relative to the frame portion of the vehicle;
   a carriage having first and second end surfaces and a peripheral surface with said carriage at least partially disposed within said cavity;
   a fastener having first and second ends with said fastener adapted to support said carriage relative to said frame portion; and
   an insulator disposed between said carriage and said wall of said collar for coupling said carriage to said collar and for isolating said carriage and said fastener from said collar;
   said insulator having a first portion and a plurality of second portions with said first portion at least partially encapsulating one of said second end surface and said peripheral surface of said carriage and said second portions being movable relative to said first portion about respective living hinges to at least partially encapsulate the other of said peripheral surface and second end surface of said carriage such that said carriage is adequately isolated from said collar.

2. An assembly as set forth in claim 1 wherein said wall is substantially annular and said carriage is substantially tubular to define a substantially tubular insulator that isolates said carriage from said collar equally in all directions.

3. An assembly as set forth in claim 2 wherein said collar defines an aperture with said continuous wall surrounding said aperture and said fastener at least partially extending through said aperture.

4. An assembly as set forth in claim 1 wherein said first portion of said insulator at least partially encapsulates said second end surface of said carriage and said second portions encapsulate said peripheral surface of said carriage.

5. An assembly as set forth in claim 4 wherein said insulator includes a plurality of neck portions defining said living hinges with said neck portions being narrower than said first and second portions.

6. An assembly as set forth in claim 4 wherein each of said second portions are substantially the same length and extend the same distance from said first portion such that said peripheral surface of said carriage is equally encapsulated.

7. An assembly as set forth in claim 6 wherein said insulator includes four second portions extending from said first portion with said second portions being positioned equidistantly around said first portion.

8. An assembly as set forth in claim 4 wherein each of said second portions are identical.

9. An assembly as set forth in claim 4 wherein said collar further includes a first flange and a second flange with said first portion of said insulator disposed between said second end surface of said carriage and said first flange to isolate said carriage from said first flange.

10. An assembly as set forth in claim 9 wherein said insulator includes a plurality of third portions that are movable relative to said first and second portions about a second living hinge to at least partially encapsulate the first end surface of said carriage such that said third portions are disposed between said first end surface of said carriage and said second flange to isolate said carriage from said second flange.

11. An assembly as set forth in claim 10 wherein one of said third portions extends from each of said second portions.

12. An assembly as set forth in claim 1 wherein said first portion of said insulator encapsulates said peripheral surface of said carriage and said second portions at least partially encapsulate said second end surface of said carriage.

13. An assembly as set forth in claim 12 wherein said first portion is substantially rectangular and wraps around said peripheral surface of said carriage.

14. An assembly as set forth in claim 13 wherein each of said second portions are substantially the same size and are equidistantly spaced along said rectangular first portion.

15. An assembly as set forth in claim 12 wherein said collar further includes a first flange and a second flange with said second portions of said insulator disposed between said second end surface of said carriage and said first flange to isolate said carriage from said first flange.

16. An assembly as set forth in claim 15 wherein said insulator includes a plurality of third portions that are movable relative to said first and second portions about a second living hinge to at least partially encapsulate the first end surface of said carriage such that said third portion is disposed between said first end surface of said carriage and said second flange to isolate said carriage from said second flange.

17. An assembly as set forth in claim 16 wherein said third portions each extend from said first portion in an opposite direction from said second portions.

18. An assembly as set forth in claim 17 wherein each of said third portions are substantially the same size and are equidistantly spaced along said rectangular first portion.

19. An assembly as set forth in claim 1 wherein said collar is further defined as an open cup having a top flange and an open bottom.

20. An assembly as set forth in claim 19 wherein said first portion of said insulator at least partially encapsulates said second end surface of said carriage to isolate said carriage from said first flange, and said second portions encapsulate said peripheral surface of said carriage to isolate said carriage from said walls.

21. An assembly as set forth in claim 19 wherein said first portion of said insulator encapsulates said peripheral surface of said carriage to isolate said carriage from said walls, and said second portions at least partially encapsulate said second end surface of said carriage to isolate said carriage from said first flange.

22. An assembly as set forth in claim 1 wherein said first and second portions of said insulator are formed of a common homogeneous material.

23. An assembly as set forth in claim 22 wherein said common homogeneous material is further defined as microcellular polyurethane.

24. An insulator for an isolation assembly of a vehicle wherein the isolation assembly includes a collar having a substantially continuous wall defining a cavity, a carriage having first and second end surfaces and a peripheral surface, and a fastener having first and second ends with said insulator disposed between the carriage and the wall of said collar for coupling the carriage to the collar, said insulator comprising;
a first portion for at least partially encapsulating one of the second end surface and the peripheral surface of the carriage; and
a plurality of second portions attached to said first portion with said second portions being movable relative to said first portion about respective living hinges for at least partially encapsulating the other of the peripheral surface and second end surface of the carriage such that the carriage is adequately isolated from the collar.

25. An assembly as set forth in claim 24 wherein said first portion of said insulator at least partially encapsulates the second end surface of the carriage and said second portions encapsulate the peripheral surface of the carriage.

26. An assembly as set forth in claim 25 wherein said insulator includes a plurality of neck portions defining said living hinges with said neck portions being narrower than said first and second portions.

27. An assembly as set forth in claim 25 wherein each of said second portions are substantially the same length and extend the same distance from said first portion for equally encapsulating the peripheral surface of the carriage.

28. An assembly as set forth in claim 27 wherein said insulator includes four second portions extending from said first portion with said second portions being positioned equidistantly around said first portion.

29. An assembly as set forth in claim 25 wherein each of said second portions are identical.

30. An assembly as set forth in claim 25 wherein said insulator includes a plurality of third portions that are movable relative to said first and second portions about a second living hinge for at least partially encapsulating the first end surface of the carriage.

31. An assembly as set forth in claim 30 wherein one of said third portions extends from each of said second portions.

32. An assembly as set forth in claim 24 wherein said first portion of said insulator encapsulates the peripheral surface of the carriage and said second portions at least partially encapsulate the second end surface of the carriage.

33. An assembly as set forth in claim 32 wherein said first portion is substantially rectangular for wrapping around the peripheral surface of the carriage.

34. An assembly as set forth in claim 32 wherein each of said second portions are substantially the same size and are equidistantly spaced along said rectangular first portion.

35. An assembly as set forth in claim 32 wherein said insulator includes a plurality of third portions that are movable relative to said first and second portions about a second living hinge for at least partially encapsulating the first end surface of said carriage.

36. An assembly as set forth in claim 35 wherein said third portions each extend from said first portion in an opposite direction from said second portions.

37. An assembly as set forth in claim 36 wherein each of said third portions are substantially the same size and are equidistantly spaced along said rectangular first portion.

38. An assembly as set forth in claim 24 wherein said first and second portions of said insulator are formed of a common homogeneous material.

39. An assembly as set forth in claim 38 wherein said common homogeneous material is further defined as microcellular polyurethane.

40. A method of installing an insulator within an isolation assembly wherein the isolation assembly includes a collar having a substantially continuous wall defining a cavity, a carriage having first and second end surfaces and a peripheral surface, and a fastener having first and second ends, and wherein the insulator includes a first portion and a plurality of second portions with living hinges disposed between the first portion and the second portions, said method comprising the steps of:
positioning the insulator about the carriage;
inserting the carriage and insulator at least partially within the cavity to couple the carriage to the collar through the insulator such that the carriage is isolated from the collar;
inserting the fastener through the carriage;
securing the fastener such that the carriage remains inserted within the cavity; and
wherein the step of positioning the insulator about the carriage is further defined as at least partially encapsulating one of the second end surface and the peripheral surface of the carriage with the first portion, moving the second portions relative to the first portion about the living hinges, and at least partially encapsulating the other of the peripheral surface and second end surface of the carriage with the second portions to adequately isolate the carriage from the collar.

41. A method as set forth in claim 40 wherein the step of positioning the insulator about the carriage is performed before the step of inserting the carriage and insulator within the cavity.

42. A method as set forth in claim 40 wherein the step of positioning the insulator about the carriage is further defined as at least partially encapsulating the second end surface of the carriage with the first portion, moving the second portions relative to the first portion about the living hinges, and encapsulating the peripheral surface of the carriage with the second portions to adequately isolate the carriage from the collar.

43. A method as set forth in claim 42 further including a plurality of third portions extending from the second portions, and wherein the step of positioning the insulator about the carriage is further defined as at least partially encapsulating the first end surface of the carriage with the third portions.

44. A method as set forth in claim 40 wherein the step of positioning the insulator about the carriage is further defined as encapsulating the peripheral surface of the carriage with the first portion, moving the second portions relative to the first portions about the living hinges, and at least partially encapsulating the second end surface of the carriage with the second portions to adequately isolate the carriage from the collar.

45. A method as set forth in claim 44 further including a plurality of third portions extending from the first portion opposite the second portions, and wherein the step of positioning the insulator about the carriage is further defined as at least partially encapsulating the first end surface of the carriage with the third portions.

46. An assembly as set forth in claim 44 wherein the step of positioning the insulator about the carriage is further defined as wrapping the peripheral surface of the carriage with the first portion.

\* \* \* \* \*